United States Patent [19]

Kassai

[11] Patent Number: 4,678,222
[45] Date of Patent: Jul. 7, 1987

[54] FRONT COVER FOR BABY CARRIAGES
[75] Inventor: Kenzou Kassai, Osaka, Japan
[73] Assignee: Aprica Kassai Kabushikikaisha, Osaka, Japan
[21] Appl. No.: 869,577
[22] Filed: Jun. 2, 1986
[30] Foreign Application Priority Data Jul. 19, 1985 [JP] Japan .......................... 60-111292[U]

[51] Int. Cl.⁴ .............................................. B60J 9/00
[52] U.S. Cl. .................................................. 296/78 A
[58] Field of Search ................... 5/416, 482, 485, 494, 5/508; 296/78 A, 78 R, 81, 82

[56] References Cited
FOREIGN PATENT DOCUMENTS

| 2906125 | 8/1980 | Fed. Rep. of Germany | 296/78 A |
| 190617 | 12/1922 | United Kingdom | 296/78 A |
| 197047 | 5/1923 | United Kingdom | 296/78 A |
| 267363 | 12/1926 | United Kingdom | 296/78 A |

Primary Examiner—Alexander Grosz
Attorney, Agent, or Firm—W. G. Fasse; D. H. Kane, Jr.

[57] ABSTRACT

A front cover for baby carriages is adapted to be attached to the seat of a baby carriage in such a manner as to cover the lower half of a baby's body placed on the seat of the baby carriage. A front cover body is made of thick cloth in bag form, and a normally plane shape retaining member of relatively high stiffness is secured to the front cover body. The shape retaining member is fixed to the upper surface of an end edge region of the front cover body which defines an opening between itself and the seating surface of the seat for receiving the baby's torso. The member is fixed along an arc bulging in a direction away from a carriage back rest when the member is in a normal flat resting position. However, when the member is turned into an operating position, the member bends or bulges the cover body upwardly along a bending line parallel to the arc, thereby imparting an upward bulge to the end edge region of the front cover body.

6 Claims, 4 Drawing Figures

FRONT COVER FOR BABY CARRIAGES

BACKGROUND OF THE INVENTION

1. Field of the Invention

This invention relates to a front cover for baby carriages which is adapted to be attached to the seat of a baby carriage in such a manner as to cover the lower half of a baby's body placed on the seat.

2. Description of the Prior Art

Front covers adapted to cover the lower half of a baby's body placed on the seat of a baby carriage are in frequent use for protection against the cold and for other purposes. Such a front cover is sold separately from baby carriages and will be used by the purchaser by attaching it to the baby carriage needed.

A typical front cover is made of thick cloth in bag form and will be placed on the seat of the baby carriage, with its opening facing toward the backrest portion of the seat of the baby carriage. In attaching a conventional front cover to the seat, it is common practice to tie it, with bands or strings, to the torso guard which connects the two handrails of the baby carriage or to fasten it to the handrails by using a hook and eye arrangement.

Such a front cover attaching method, however, is troublesome and, furthermore, has the drawback that the opening for receiving the lower half of the baby's body cannot be kept easily in its open state. More particularly, even if the upper wall of the front cover is suspended using the torso guard or handrails, the size of the opening is limited. This is because the front cover, which is made of cloth, tends to sag, narrowing the opening. The inability to keep the opening wide enough for inserting the baby makes it difficult to mount a baby on or take the baby off the seat and also causes a baby to feel closed in when a baby is placed on the seat.

SUMMARY OF THE INVENTION

Accordingly, the invention is intended to provide a front cover for baby carriages which is constructed so that its opening can be kept wide open to make it easier to seat a baby on or to take a baby off the seat and which does not cause a baby to feel closed in.

The front cover of this invention is adapted to be attached to a baby carriage provided with a seat having a seating surface on which to place a baby and serves to cover the lower half of the baby's body placed on the seat. The front cover comprises a front cover body defining a space between it and the seating surface for receiving the lower half of a baby's body and having an end edge region positioned forwardly of the baby's torso, and a planar shape retaining sheet of relatively high stiffness which is fixed to the upper surface of the end edge region of the front cover body along a forwardly bulging arc and which is bent upwardly and rearwardly along a bending line which is substantially parallel to said arc, which bending provides an upward bulge to the end edge region of the front cover body.

In this invention, the shape retaining sheet functions as follows: Usually, it is natural for a planar sheet to be bent along a straight bending line. In contrast, in this invention, the shape retaining sheet of relatively high stiffness is bendable along a bending line which is deliberately arcuate. In this bending, therefore, strains are produced in portions of the shape retaining sheet on opposite sides of the bending line, but the shape retaining sheet accommodates these strains by producing an upward bulge. Therefore, the end edge region of the front cover body, which is fixed along an arc parallel to said bending line, likewise forms an upward bulge along the bulge of the shape retaining sheet.

According to this invention, there is obtained a convenient front cover, wherein the opening in the front cover for receiving a baby's legs and lower body can be kept wide open and does not develop a sense of restriction in the baby or impede the seating or removal of the baby. Since the arrangement for imparting an upward bulge to the front cover body utilizes the bending which takes place along the arcuate bending line of the shape retaining sheet, the fixing of the shape retaining sheet and front cover body can be easily done by handling them while they are in planar form. That is, despite the fact that the completed article has a three dimensional bulge, at the fabrication stage the components can be handled in planar form, without requiring any special device or procedure; thus, the production is very efficient.

DETAILED DESCRIPTION OF PREFERRED EXAMPLE EMBODIMENTS AND OF THE BEST MODE OF THE INVENTION

Figure 1:
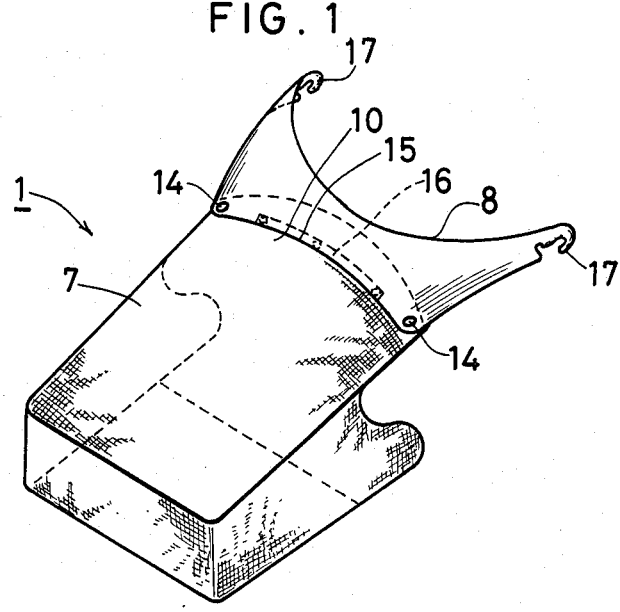
FIG. 1 is a perspective view showing the appearance of a front cover according to an embodiment of this invention illustrating a shape retaining sheet or member in its operating position.

In FIG. 1, the appearance of an embodiment of this invention is shown in a perspective view. A front cover 1 comprises a front cover body 7 made of thick cloth in bag form, and a shape retaining sheet or member 8 made of a material having a relatively high stiffness, e.g., vinyl chloride resin sheet material. The manner of combination of said front cover body 7 and said shape retaining sheet 8 is as follows.

Figure 2:
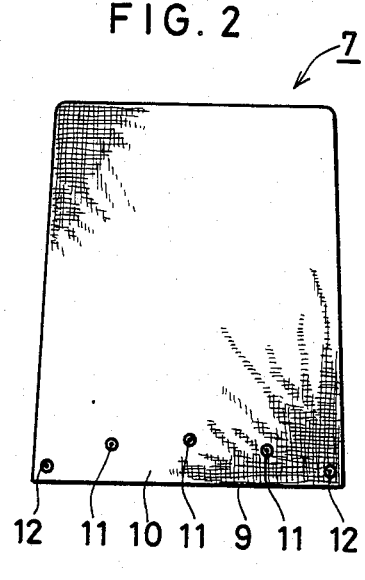
FIG. 2 is a plan view of a front cover body included in the front cover.
Figure 4:
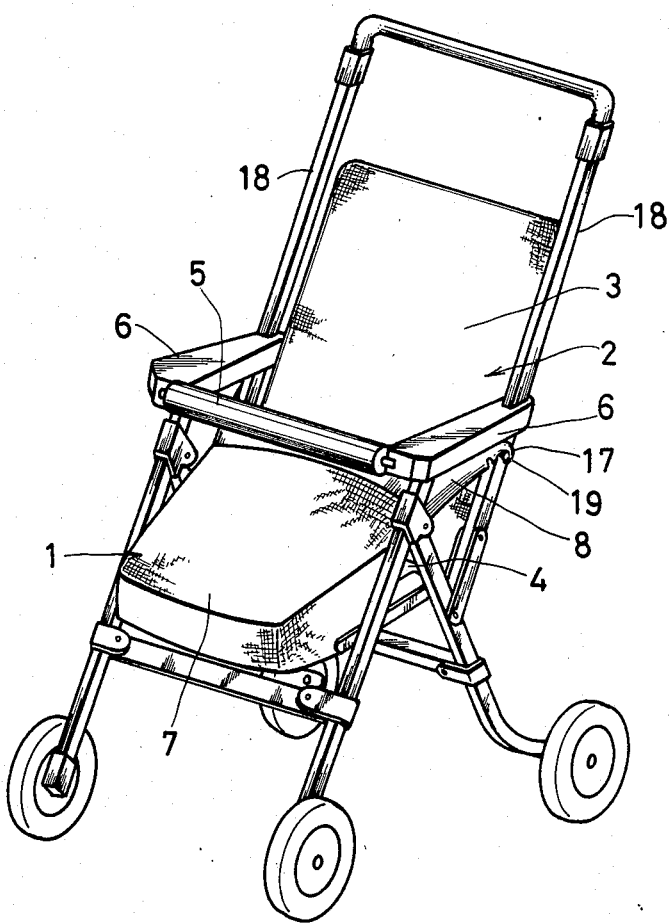
FIG. 4 is a perspective view showing the front cover of FIG. 1 attached to a seat of a baby carriage.

In FIG. 2, the lower edge 9 of the front cover body 7 defines an opening facing toward a backrest 3 (FIG. 4). Therefore, in FIG. 2, the upper side of the cover body 7 corresponds to the front part of a seat 2 (FIG. 4).

The upper surface of the end edge region 10 of the front cover body 7 is provided with a plurality of snap buttons 11 and 12 disposed along an arc which bulges forwardly, i.e., upwardly as viewed in FIG. 2.

Figure 3:
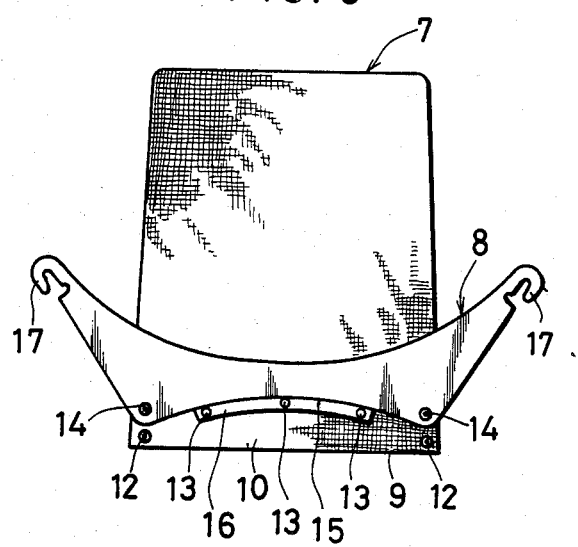
FIG. 3 is a plan view showing the shape retaining member 7 fixed to the front cover body in the resting position of the member.
Figure 3A:
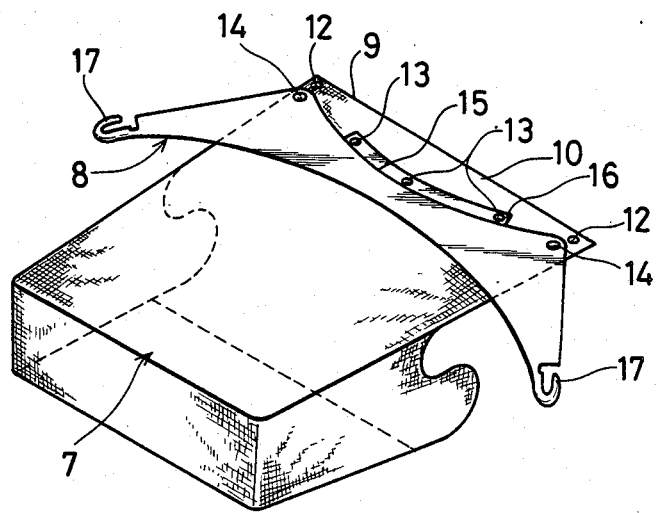
FIG. 3A is a perspective view of FIG. 3.

In FIG. 3, the shape retaining sheet or member 1 8 is shown attached to the front cover body 7. The shape retaining member 8 somewhat resembles the form of a wing. Snap buttons 13 corresponding to the snap buttons 11 shown in FIG. 1, are disposed along the same arc. Further, snap buttons 14 corresponding to the snap buttons 12 are disposed at opposite ends. The snap buttons 13 are installed on a projecting strip 16 extending from a bending arc 15 which is parallel to the arc which determines the direction of disposition of these snap buttons 13. FIG. 3 shows the state in which the snap buttons 13 of the shape retaining member 8 are engaged with the snap buttons 11 of the cover body 7, whereby the hooks 17 of the wing shaped member 8 point upwardly in FIG. 3. However, when the member 8 is folded downwardly in FIG. 3, an upward bulge is formed in the cover body 7 along the bending line 15. Accordingly, the end edge region 10 of the front cover body 7 is likewise formed with an upward bulge as best seen in FIG. 1. In this state in which the hooks 17 point as shown in FIG. 1, the snap buttons 14 are engaged with the associated snap buttons 12.

The front cover 1 configured as shown in FIG. 1 can be easily attached to the seat 2 of a baby carriage, as shown in FIG. 4 by said hooks 17 at opposite ends of the shape retaining member 8. That is, opposite outer sides of the baby carriage, e.g., the outer surfaces of the push rods 18 of the baby carriage are provided with pins 19, so that by engaging the hooks 17 with these pins 19, the front cover 1 can be fixed to the baby carriage approximately above the seat 2 as shown in FIG. 4. In addition, in FIG. 1, the hooks 17 are shown deformed to define substantially vertical planes, but this state should be understood simply to indicate the form they will assume when attached to the baby carriage.

In alternate embodiments the means for attaching the front cover 1 to the baby carriage may comprise means other than hooks 17 and pins 19, for example snap buttons, a hook and eye arrangements, bands, strings or the like.

Further, the means for securing the shape retaining member 8 to the front cover body 7 may, comprise a seam made by sewing with a thread, or a bonding formed by an adhesive.

The shape retaining member 8 may be made of a material of high stiffness other than vinyl chloride resin. Thus, the requirement is that the shape retaining member 8 may be made of a material having a higher stiffness than that of the front cover body 7.

Although the present invention has been described and illustrated in detail, it is clearly understood that the same is by way of illustration and example only and is not to be taken by way of limitation, the scope of the present invention being limited only by the terms of the appended claims.

What is claimed is:

1. A front cover for a baby carriage having a seat with a seating surface on which to place a baby and a back rest extending approximately upwardly from said seating surface, said front cover serving to cover the lower half of a baby's body placed on the seat, said front cover comprising a front cover body defining a space between itself and said seating surface for receiving the lower half of a baby's body, said front cover body having a first end edge region facing toward said back rest and a second end edge facing away from said back rest, a shape retaining member made of a material of relatively high stiffness, and means securing said shape retaining member to an upper surface of said first end edge region of said front cover body along an arc normally bulging toward said second end edge away from said back rest, whereby said shape retaining member is normally in a resting position flat on said front cover body, said securing means permitting said shape retaining member to be turned out of said resting position into an operative position in which said shape retaining member causes said front cover body to form an upward bulge at least of said first end edge region to open said front cover for easy access.

2. The front cover of claim 1, wherein the widthwise opposite ends of said shape retaining member are formed with hooks for engagement with pins installed on opposite sides of said baby carriage for cooperation with said hooks.

3. The front cover of claim 1, including fixing means (11, 13) for releasably securing said shape retaining member to said front cover body along said arc in said restng position.

4. The front cover of claim 1, including further means (12, 14) for fixing said shape retaining member to said front cover body in said operative position so that said shape retaining member is held in said operative position.

5. A front cover for a baby carriage having a seat with a seating surface on which to place a baby and a back rest extending approximately upwardly from said seating surface, said front cover serving to cover the lower half of a baby's body placed on the seat, said front cover comprising a front cover body forming a bag for receiving the lower half of a baby's body seated on said seating surface, said bag having a top wall with a first end edge region facing toward said back rest and with a second end edge facing away from said back rest, a plane shape retaining stiff member made of a material of relatively high stiffness, first means (11, 13; 12, 14) securing said shape retaining stiff member to an upper surface of said first end edge region of said bag along an arc bulging toward said second end edge away from said back rest when said shape retaining member is in a resting position flat on and in parallel to said top wall of said bag, said first securing means permitting said shape retaining member to be turned out of said resting position into an operative position to which said shape retaining member causes said top wall of said bag to form an upward bulge at least of said first end edge region of said top wall to open said bag for easy access, and further securing means (17) for securing ends of said shape retaining stiff member to opposite sides of said baby carriage.

6. The front cover of claim 5, wherein said shape retaining stiff member has an approximately wing shaped configuration with one edge corresponding to said arc, said first securing means securing said stiff member to said top wall along said one edge and next to said one edge, said further securing means being connected to outer ends of said wing shaped configuration.

* * * * *

UNITED STATES PATENT AND TRADEMARK OFFICE
CERTIFICATE OF CORRECTION

PATENT NO. : 4,678,222
DATED : July 7, 1987
INVENTOR(S) : Kenzou Kassai

It is certified that error appears in the above-identified patent and that said Letters Patent is hereby corrected as shown below:

Claim 3, line 4, (column 4, line 18,) replace "restng" by --resting--;

Claim 5, line 20, (column 4, line 43,) replace "to" by --in--.

Signed and Sealed this

Twenty-seventh Day of October, 1987

Attest:

DONALD J. QUIGG

Attesting Officer

Commissioner of Patents and Trademarks